US012681712B2

(12) United States Patent
Chappa et al.

(10) Patent No.: US 12,681,712 B2
(45) Date of Patent: *\*Jul. 14, 2026

(54) CREATION OF A PERFORMANCE-OPTIMIZED IMAGE OF A SERVER

(71) Applicant: Bank of America Corporation, Charlotte, NC (US)

(72) Inventors: Suresh Kumar Chappa, Telangana (IN); Pradip Bachaspati, Haryana (IN); Rahul Arora, Telangana (IN); Ganesh Javvadi, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/780,717

(22) Filed: Jul. 23, 2024

(65) Prior Publication Data
US 2024/0378040 A1 Nov. 14, 2024

Related U.S. Application Data

(63) Continuation of application No. 18/054,013, filed on Nov. 9, 2022, now Pat. No. 12,093,674.

(51) Int. Cl.
*G06F 8/61* (2018.01)
*G06F 8/71* (2018.01)

(52) U.S. Cl.
CPC . *G06F 8/63* (2013.01); *G06F 8/71* (2013.01)

(58) Field of Classification Search
CPC .................................... G06F 8/63; G06F 8/71
See application file for complete search history.

(56) References Cited

U.S. PATENT DOCUMENTS

| | | | | |
|---|---|---|---|---|
| 7,249,174 B2 * | 7/2007 | Srinivasa | ............ | H04L 41/0803 714/2 |
| 7,263,597 B2 * | 8/2007 | Everdell | ................ | H04L 41/22 709/201 |
| 7,467,198 B2 | 12/2008 | Goodman et al. | | |
| 8,131,843 B2 * | 3/2012 | Yellin | ................ | G06F 11/3433 709/224 |
| 8,296,755 B2 * | 10/2012 | Srinivasa | ............ | H04L 67/1008 717/176 |
| 8,341,732 B2 | 12/2012 | Croft et al. | | |
| 8,448,170 B2 | 5/2013 | Wipfel et al. | | |
| 8,448,171 B2 | 5/2013 | Donnellan et al. | | |
| 8,495,646 B2 | 7/2013 | Uchida | | |

(Continued)

*Primary Examiner* — Douglas M Slachta

(57) ABSTRACT

A system and method for creating a performance-optimized server image. The method includes receiving performance information of one or more servers of a first type. Current values for performance parameters of the one or more servers are determined based on the logs. Optimal value ranges for the performance parameters are determined. In response to determining that, for at least one performance parameter, a current value is outside a respective optimal value range, a new version of the server image is created. New values for the performance parameters are determined. In response to determining that, for each performance parameter, a new value is within a respective optimal value range, the new version of the server image is validated as a performance-optimized version of the server image.

20 Claims, 3 Drawing Sheets

(56) References Cited

U.S. PATENT DOCUMENTS

| | | | |
|---|---|---|---|
| 8,549,114 B2 * | 10/2013 | Reddy | H04L 67/1008 |
| | | | 709/224 |
| 8,869,164 B2 | 10/2014 | Bobroff et al. | |
| 8,965,937 B2 | 2/2015 | Cashman et al. | |
| 9,116,733 B2 | 8/2015 | Banga et al. | |
| 9,128,772 B2 * | 9/2015 | Mahesh | G06F 3/0613 |
| 9,170,849 B2 | 10/2015 | Khatri et al. | |
| 9,210,141 B2 | 12/2015 | Anderson et al. | |
| 9,239,786 B2 * | 1/2016 | Ki | G06F 3/0679 |
| 9,323,561 B2 | 4/2016 | Ayala et al. | |
| 9,578,088 B2 | 2/2017 | Nickolov et al. | |
| 9,870,238 B2 | 1/2018 | Slioussar et al. | |
| 10,025,611 B2 * | 7/2018 | Figueroa | G06F 8/61 |
| 10,659,286 B2 * | 5/2020 | Kraus | G06F 9/466 |
| 10,891,140 B1 * | 1/2021 | Levin | G06F 9/45533 |
| 10,942,781 B2 | 3/2021 | Ding et al. | |
| 11,132,210 B2 | 9/2021 | Anwar et al. | |
| 11,698,944 B2 * | 7/2023 | Blumenfeld | G06F 16/958 |
| | | | 715/234 |
| 2014/0136825 A1 * | 5/2014 | Uchiumi | G06F 9/44505 |
| | | | 713/1 |
| 2019/0258464 A1 * | 8/2019 | Wells | G06F 8/35 |
| 2020/0257612 A1 * | 8/2020 | Lang | G06F 11/3612 |
| 2021/0406212 A1 * | 12/2021 | Thakar | G06F 15/17337 |
| 2023/0004858 A1 * | 1/2023 | Santhanagopal | G06F 8/20 |

* cited by examiner

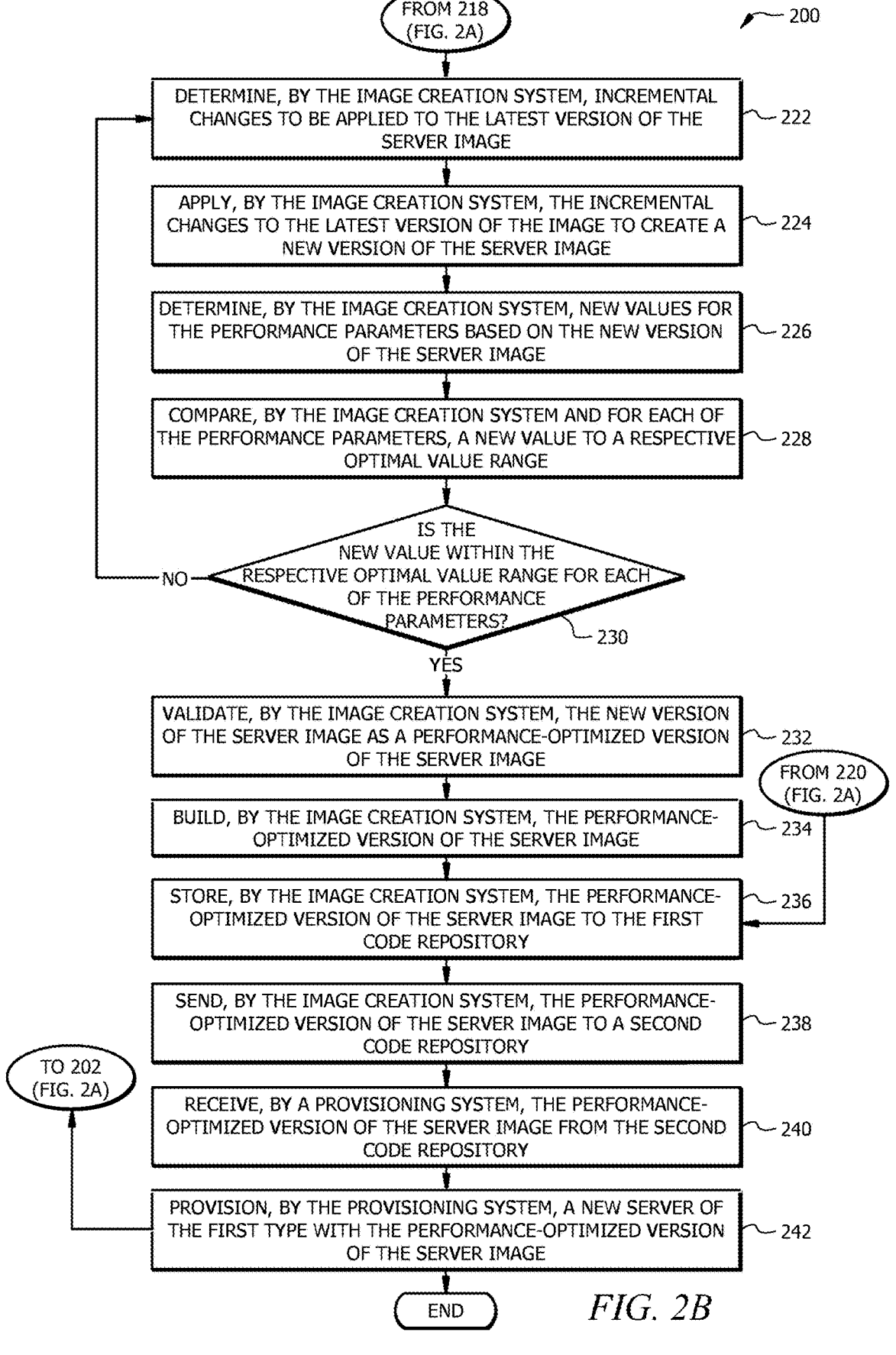

FROM 218
(FIG. 2A)

— 200

DETERMINE, BY THE IMAGE CREATION SYSTEM, INCREMENTAL CHANGES TO BE APPLIED TO THE LATEST VERSION OF THE SERVER IMAGE — 222

APPLY, BY THE IMAGE CREATION SYSTEM, THE INCREMENTAL CHANGES TO THE LATEST VERSION OF THE IMAGE TO CREATE A NEW VERSION OF THE SERVER IMAGE — 224

DETERMINE, BY THE IMAGE CREATION SYSTEM, NEW VALUES FOR THE PERFORMANCE PARAMETERS BASED ON THE NEW VERSION OF THE SERVER IMAGE — 226

COMPARE, BY THE IMAGE CREATION SYSTEM AND FOR EACH OF THE PERFORMANCE PARAMETERS, A NEW VALUE TO A RESPECTIVE OPTIMAL VALUE RANGE — 228

IS THE NEW VALUE WITHIN THE RESPECTIVE OPTIMAL VALUE RANGE FOR EACH OF THE PERFORMANCE PARAMETERS? — 230

NO

YES

VALIDATE, BY THE IMAGE CREATION SYSTEM, THE NEW VERSION OF THE SERVER IMAGE AS A PERFORMANCE-OPTIMIZED VERSION OF THE SERVER IMAGE — 232

FROM 220
(FIG. 2A)

BUILD, BY THE IMAGE CREATION SYSTEM, THE PERFORMANCE-OPTIMIZED VERSION OF THE SERVER IMAGE — 234

STORE, BY THE IMAGE CREATION SYSTEM, THE PERFORMANCE-OPTIMIZED VERSION OF THE SERVER IMAGE TO THE FIRST CODE REPOSITORY — 236

SEND, BY THE IMAGE CREATION SYSTEM, THE PERFORMANCE-OPTIMIZED VERSION OF THE SERVER IMAGE TO A SECOND CODE REPOSITORY — 238

TO 202
(FIG. 2A)

RECEIVE, BY A PROVISIONING SYSTEM, THE PERFORMANCE-OPTIMIZED VERSION OF THE SERVER IMAGE FROM THE SECOND CODE REPOSITORY — 240

PROVISION, BY THE PROVISIONING SYSTEM, A NEW SERVER OF THE FIRST TYPE WITH THE PERFORMANCE-OPTIMIZED VERSION OF THE SERVER IMAGE — 242

END

*FIG. 2B*

CREATION OF A PERFORMANCE-OPTIMIZED IMAGE OF A SERVER

CROSS-REFERENCE TO RELATED APPLICATION

The application is a continuation of U.S. patent application Ser. No. 18/054,013, filed Nov. 9, 2022, entitled "CREATION OF A PERFORMANCE-OPTIMIZED IMAGE OF A SERVER," which is incorporated herein by reference.

TECHNICAL FIELD

The present disclosure relates generally to creation of server images, and more specifically to a system and method for creating performance-optimized server images.

BACKGROUND

In general, a full-stack environment includes a plurality of servers of different types, such as application servers, middleware servers, and/or database servers. When a new server is added to the full-stack environment, the new server is provisioned with the latest version of a respective server image. However, the new server that is provisioned with the latest version of the server image may not have a desired optimal performance.

SUMMARY

The system described in the present disclosure provides several practical applications and technical advantages that overcome the current technical problems as described herein. The following disclosure is particularly integrated into practical applications of: (1) creating performance-optimized versions of server images; and (2) improving a performance of a full-stack environment by provisioning new servers with the performance-optimized versions of the server images. In particular, the new servers that are provisioned with the performance-optimized versions of the server images have optimal performance parameters, which leads to performance improvements of the full-stack environment.

In an example operation, when a new server is added to a full-stack environment, the new server is provisioned with the latest version of a respective server image. However, the new server that is provisioned with the latest version of the server image may not have a desired optimal performance.

The disclosed system is configured to create performance-optimized versions of server images. In particular, a plurality of servers that are integrated into the full-stack environment are monitored to determine current values of various performance parameters. The current values of the performance parameters are compared to optimal values of the performance parameters to determine incremental changes that are to be applied to the latest version of the server image. The incremental changes are applied to the latest version of the server image to create a performance-optimized version of the server image. The performance-optimized version of the server image is used to provision a new server that is to be added to the full-stack environment. Such new servers improve the performance of the full-stack environment, since they have optimal performance parameters. Accordingly, the disclosed system and method are integrated into a practical application of: (1) creating performance-optimized versions of server images; and (2) improving the performance of a full-stack environment by provisioning new servers with the performance-optimized versions of the server images.

In one embodiment, a method includes receiving logs. The logs include performance information of one or more servers of a first type. A latest version of a server image of the first type is received from a code repository. Current values for performance parameters of the one or more servers are determined based on the logs. A most optimal server configuration is determined. The most optimal server configuration includes optimal value ranges for the performance parameters. For each of the performance parameters, a current value is compared to a respective optimal value range. In response to determining that, for at least one of the performance parameters, the current value is outside the respective optimal value range, incremental changes to be applied to the latest version of the server image are determined. The incremental changes are applied to the latest version of the server image to create a new version of the server image. New values for the performance parameters are determined based on the new version of the server image. For each of the performance parameters, a new value is compared to a respective optimal value range. In response to determining that, for each of the performance parameters, the new value is within the respective optimal value range, the new version of the server image is validated as a performance-optimized version of the server image. The performance-optimized version of the server image is built. Accordingly, the above embodiment is integrated into a practical application of creating performance-optimized versions of server images.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

FIGS. 2A and 2B illustrate an example operational flow of system of FIG. 1 for creating a performance-optimized image of a server.

DETAILED DESCRIPTION

Figure 1:
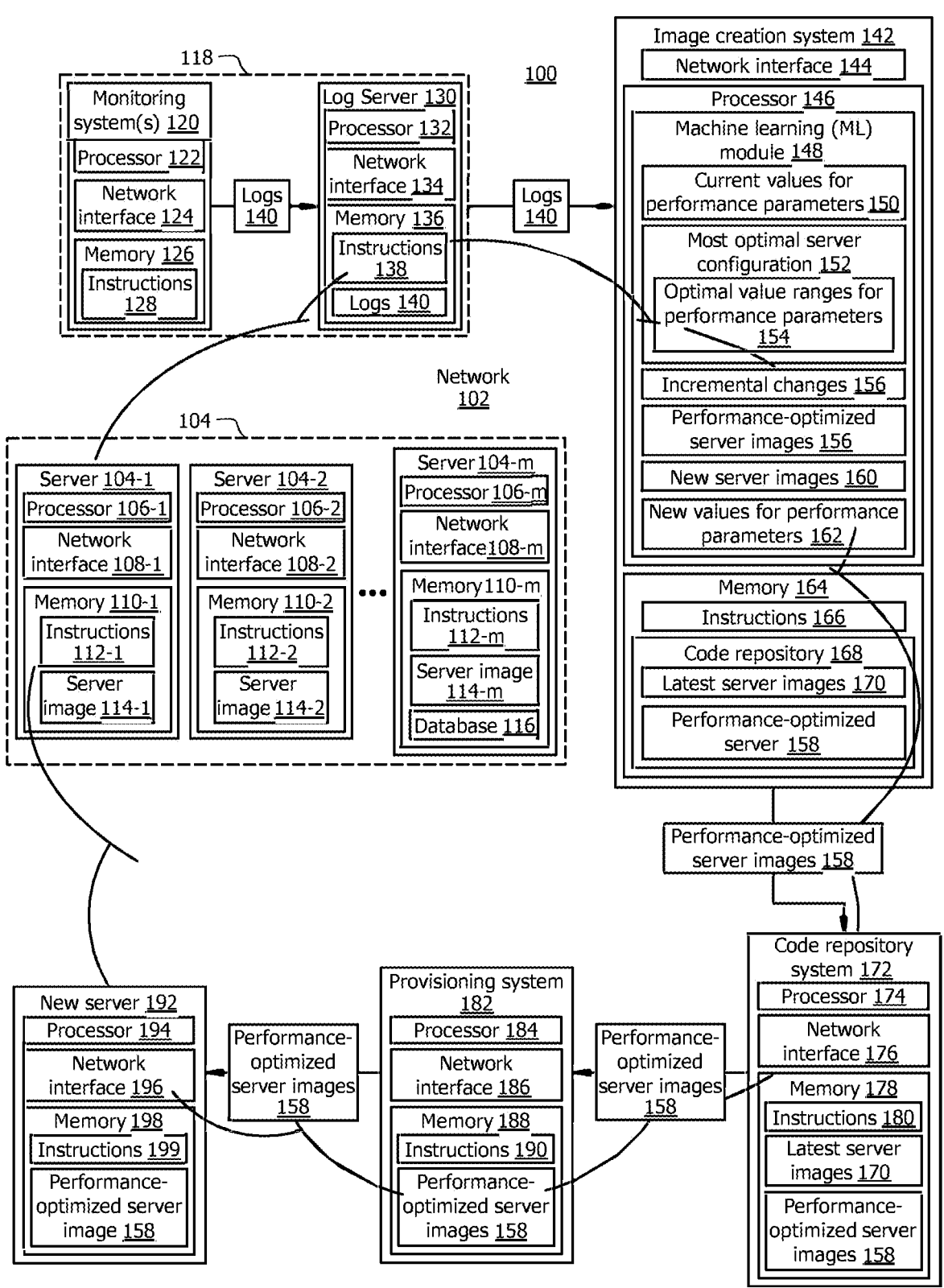
FIG. 1 illustrates an embodiment of a system configured to create a performance-optimized image of a server.
Figure 2A:
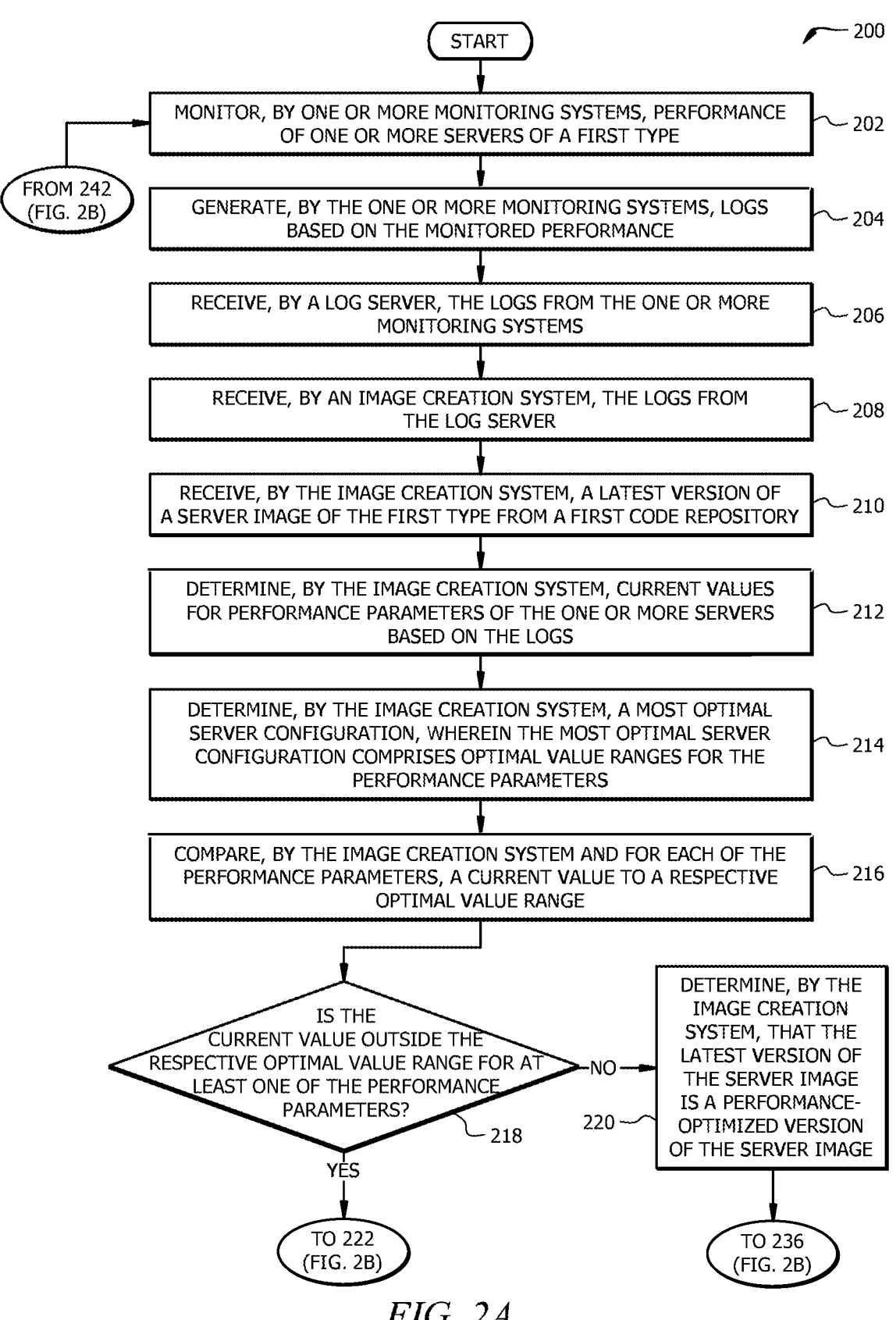

As described above, previous technologies fail to provide a system and method for creating a performance-optimized image of a server. Embodiments of the present disclosure and its advantages may be understood by referring to FIGS. 1, 2A and 2B. FIGS. 1, 2A and 2B are used to describe a system and method for creating a performance-optimized image of a server.

System Overview

FIG. 1 illustrates an embodiment of a system 100 that is generally configured to create a performance-optimized image of a server. In general, the system monitors a plurality of servers that are integrated into a full-stack environment to determine current values of various performance parameters. The current values of the performance parameters are compared to optimal values of the performance parameters to determine incremental changes that are to be applied to the latest version of a server image. The incremental changes are applied to the latest version of the server image to create a performance-optimized version of the server image. The performance-optimized version of the server image is used to provision a new server that is to be added to the plurality of servers. The image creating process may be performed in a loop, such that when a new server is added to the plurality of servers, the new server is provisioned with the latest performance-optimized version of the server image.

In certain embodiments, the system 100 comprises to a plurality of servers 104 (e.g., servers 104-1 through 104-$m$), a monitoring and logging system 118, an image creation system 142, a code repository system 172, a provisioning system 182, and a new server 192 that are operably coupled to one another via a network 102. Network 102 enables the communication between the components of the system 100. Image creation system 142 comprises a processor 146 in signal communication with a memory 164. Memory 164 stores software instructions 166 that when executed by the processor 146, cause the image creation system 142 to execute the operations described herein. In one embodiment, processor 146 executes software instructions 166 to implement a machine learning (ML) module 148 that is configured to create a performance-optimized image of a server. In other embodiments, the system 100 may not have all the components listed and/or may have other elements instead of, or in addition to, those listed above. For example, all or some of the monitoring and logging system 118, the image creation system 142, the code repository system 172, and the provisioning system 182 may be integrated into a single system.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Servers

In certain embodiments, the plurality of servers 104 (e.g., servers 104-1 through 104-$m$) may be integrated into a full-stack environment. In such embodiments, the plurality of servers 104 may comprise servers of different types. For example, each of the servers 104 may be an application server, a middleware server, or a database server, such that the plurality of servers 104 comprise one or more application servers, one or more middleware servers, and/or one or more database servers.

Each of the servers 104 is generally any device that is configured to process data and communicate with other components of the system 100 via the network 102. Each of the servers 104 comprises a respective one of processors 106

(e.g., processors 106-1 through 106-$m$) in signal communication with a respective one of memories 110 (e.g., memories 110-1 through 110-$m$) and a respective one of network interfaces 108 (e.g., network interfaces 108-1 through 108-$m$).

Each of the processors 106 comprises one or more processors operably coupled to a respective one of the memories 110. Each of the processors 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 106 may be a programmable logic device, a microcontroller, a microprocessor, or any suitable combination of the preceding. The one or more processors are configured to process data and may be implemented in hardware or software. For example, each of the processors 106 may be 8-bit, 16-bit, 32-bit, 64-bit, or of any other suitable architecture. Each of the processors 106 is configured to implement various software instructions. For example, each of the processors 106 is configured to execute respective ones of software instructions 112 (e.g., software instructions 112-1 through 112-$m$) that is stored in a respective one of the memories 110 in order to perform the operations described herein.

Each of the network interfaces 108 is configured to enable wired and/or wireless communications (e.g., via network 102). Each of the network interfaces 108 is configured to communicate data between a respective one of the servers 104 and other components of the system 100. For example, each of the network interfaces 108 may comprise a WIFI interface, a local area network (LAN) interface, a wide area network (WAN) interface, a modem, a switch, or a router. Each of the network interfaces 108 may be configured to use any suitable type of communication protocol as would be appreciated by one of ordinary skill in the art.

Each of the memories 110 may be volatile or non-volatile and may comprise a read-only memory (ROM), random-access memory (RAM), ternary content-addressable memory (TCAM), dynamic random-access memory (DRAM), and static random-access memory (SRAM). Each of the memories 110 may be implemented using one or more disks, tape drives, solid-state drives, and/or the like. Each of the memories 110 is operable to store respective ones of software instructions 112, and/or any other data and instructions. Each of the software instructions 112 may comprise any suitable set of software instructions, logic, rules, or code.

In certain embodiments, each of the memories 110 may further comprise a respective one of the server images 114 (e.g., server images 114-1 through 114-$m$). For example, when a server (e.g., server 104-1) is an application server, a respective server image (e.g., server image 114-1) comprises an application server image. When a server is a middleware server (e.g., server 104-2), a respective server image (e.g., server image 114-2) comprises a middleware server image. When a server (e.g., server 104-$m$) is a database server, a respective server image (e.g., server image 114-$m$) comprises a database server image. In an embodiment when a server (e.g., server 104-$m$) is a database server, a respective memory (e.g., memory 110-$m$) further comprises a database (e.g., database 116). Each of the server images 114 may comprise a respective operating system and applications that are to be executed by a respective one of the processors 106 in order to perform desired operations of a respective one of the servers 104. In certain embodiments, each of the server images 114 comprises a respective one of the software instructions 112 and/or the database 116.

In certain embodiments, servers of a same type may comprise different versions of the respective server image. For example, some application servers may comprise the latest version of the application server image, while other application servers may comprise earlier versions of the application server image. Some middleware servers may comprise the latest version of the middleware server image, while other middleware servers may comprise earlier versions of the middleware server image. Some database servers may comprise the latest version of the database server image, while other database servers may comprise earlier versions of the database server image.

Monitoring and Logging System

The monitoring and logging system 118 may comprise one or more monitoring systems 120 operably coupled to a log server 130 via a network 102. In other embodiments, the one or more monitoring systems 120 and the log server 130 may be integrated into a single system.

Each of the one or more monitoring systems 120 may be a network monitoring system, an application server monitoring system, a middleware server monitoring system, or a database server monitoring system. In certain embodiments, the one or more monitoring systems 120 may comprise an application server monitoring system, a middleware server monitoring system, and/or a database server monitoring system.

Each of the one or more monitoring systems 120 is generally any device that is configured to process data and communicate with other components of the system 100 via the network 102. Each of the one or more monitoring systems 120 may comprise a processor 122 in signal communication with a memory 126 and a network interface 124.

Processor 122 comprises one or more processors operably coupled to the memory 126. The processor 122 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The one or more processors are configured to process data and may be implemented in hardware or software. For example, the processor 122 may be 8-bit, 16-bit, 32-bit, 64-bit, or of any other suitable architecture. The one or more processors are configured to implement various software instructions to perform the operations described herein. For example, the one or more processors are configured to execute software instructions 128 and perform one or more functions described herein.

Network interface 124 is configured to enable wired and/or wireless communications (e.g., via network 102). The network interface 124 is configured to communicate data between the one or more monitoring systems 120 and other components of the system 100. For example, the network interface 124 may comprise a WIFI interface, a local area network (LAN) interface, a wide area network (WAN) interface, a modem, a switch, or a router. The processor 122 is configured to send and receive data using the network interface 124. The network interface 124 may be configured to use any suitable type of communication protocol as would be appreciated by one of ordinary skill in the art.

Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. Memory 126 is operable to store software instructions 128, and/or any other data and instructions. The software instructions 128 may comprise any suitable set of software instructions, logic, rules, or code.

The one or more monitoring systems 120 may be configured to monitor performance of the servers 104 and generate logs 140. In certain embodiments, the one or more monitoring systems 120 are configured to send one or more requests to the servers 104 and receive one or more responses in response to sending the one or more requests. One or more requests may comprise a request for a performance information of the servers 104. One or more responses may comprise a performance information of the servers 104. The logs 140 may be generated by one or more monitoring systems 120 based on the one or more responses.

Log server 130 is generally any device that is configured to process data and communicate with other components of the system 100 via the network 102. Log server 130 may comprise a processor 132 in signal communication with a memory 136 and a network interface 134.

Processor 132 comprises one or more processors operably coupled to the memory 136. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The one or more processors are configured to implement various software instructions to perform the operations described herein. For example, the one or more processors are configured to execute software instructions 138 and perform one or more functions described herein.

Network interface 134 is configured to enable wired and/or wireless communications (e.g., via network 102). The network interface 134 is configured to communicate data between the log server 130 and other components of the system 100. For example, the network interface 134 may comprise a WIFI interface, a local area network (LAN) interface, a wide area network (WAN) interface, a modem, a switch, or a router. The processor 132 is configured to send and receive data using the network interface 134. The network interface 134 may be configured to use any suitable type of communication protocol as would be appreciated by one of ordinary skill in the art.

Memory 136 may be volatile or non-volatile and may comprise a read-only memory (ROM), random-access memory (RAM), ternary content-addressable memory (TCAM), dynamic random-access memory (DRAM), and static random-access memory (SRAM). Memory 136 may be implemented using one or more disks, tape drives, solid-state drives, and/or the like. Memory 136 is operable to store software instructions 138, and/or any other data and instructions. The software instructions 138 may comprise any suitable set of software instructions, logic, rules, or code.

Log server 130 may be configured to receive the logs 140 from the one or more monitoring systems 120 and store the logs 140 in the memory 136. Log server 130 may be further configured to send the logs 140 to the image creation system 142.

Image Creation System

The image creation system 142 is generally any device that is configured to process data and communicate with other components of the system 100 via the network 102. The image creation system 142 may comprise a processor 146 in signal communication with a memory 164 and a network interface 144.

Processor 146 comprises one or more processors operably coupled to the memory 164. The processor 146 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 146 may be a programmable logic device, a microcontroller, a microprocessor, or any suitable combination of the preceding. The one or more processors are configured to process data and may be implemented in hardware or software. For example, the processor 146 may be 8-bit, 16-bit, 32-bit, 64-bit, or of any other suitable architecture. The one or more processors are configured to implement various software instructions to perform the operations described herein. For example, the one or more processors are configured to execute software instructions 166 to implement the machine learning (ML) module 148 and perform one or more functions described herein. In this way, processor 146 may be a special-purpose computer designed to implement the functions disclosed herein.

Network interface 144 is configured to enable wired and/or wireless communications (e.g., via network 102). The network interface 144 is configured to communicate data between the image creation system 142 and other components of the system 100. For example, the network interface 144 may comprise a WIFI interface, a local area network (LAN) interface, a wide area network (WAN) interface, a modem, a switch, or a router. The processor 146 is configured to send and receive data using the network interface 144. The network interface 144 may be configured to use any suitable type of communication protocol as would be appreciated by one of ordinary skill in the art.

Memory 164 may be volatile or non-volatile and may comprise a read-only memory (ROM), random-access memory (RAM), ternary content-addressable memory (TCAM), dynamic random-access memory (DRAM), and static random-access memory (SRAM). Memory 164 may be implemented using one or more disks, tape drives, solid-state drives, and/or the like. Memory 164 is operable to store software instructions 166, and/or any other data and instructions. The software instructions 166 may comprise any suitable set of software instructions, logic, rules, or code.

Memory 164 may comprise a code repository 168. The code repository 168 may store the latest versions of the server images 170. In certain embodiments, the latest versions of the server images 170 may comprise the latest version of the application server image, the latest version of the middleware server image, and/or the latest version of the database server image.

The image creation system 142 may be configured to create a performance-optimized version of a server image 158 from the latest version of the server image 170 based on the performance of the servers 104. In certain embodiments, the image creation system 142 may be configured to receive the logs 140 from the monitoring and logging system 118 and determine current values for the performance parameters of the servers 104 based on the logs 140. The performance parameters may comprise an input-output operations per second (IOPS) performance, a response time, a computing performance, and/or a number of error messages for a pre-determined time interval. The current values for the performance parameters 150 are compared to optimal values for the performance parameters 154 to determine incremental changes 156 that are to be applied to the latest version of the server image 170. The incremental changes 156 may comprise incremental changes to memory allocation parameters, processor allocation parameters, and/or network bandwidth allocation parameters. The incremental changes 156 are applied to the latest version of the server image 170 to create the performance-optimized version of the server image 158. The performance-optimized version of the server image 158 may be stored in the code repository 168 of the image creation system 142. The performance-optimized version of the server image 158 may be also stored in the code repository system 172.

Machine Learning Module

Machine learning (ML) module 148 may be implemented by the processor 146 executing the software instructions 166 and is generally configured to create a performance-optimized image of a server. In certain embodiments, the processor 146 may execute the operations described herein as being associated with the ML module 148 without implementing the ML module 148 itself.

In certain embodiments, the ML module 148 may be implemented by a support vector machine, neural network, random forest, k-means clustering, etc. In certain embodiments, the ML module 148 may be implemented by a plurality of neural network layers, convolutional neural network layers, Long-Short-Term-Memory (LSTM) layers, Bi-directional LSTM layers, recurrent neural network layers, and the like. In certain embodiments, the ML module 148 may be implemented by a text processing, natural language processing, and the like. In certain embodiments, the ML module 148 may be implemented by unsupervised, semi-supervised, and/or supervised machine learning techniques.

In certain embodiments, the ML module 148 may be implemented by a machine learning algorithm that is executed by processor 146. Machine learning algorithm may be any suitable machine learning algorithm, such as a neural network machine learning algorithm, a naïve bayes algorithm, a nearest neighbor algorithm, a support vector machine, and/or any other suitable machine learning algorithm. Machine learning algorithm may be a supervised machine learning algorithm, an unsupervised machine learning algorithm, a semi-supervised learning algorithm, or a reinforcement learning algorithm.

In certain embodiments, the ML module 148 may be configured to perform operations of method 200 (see FIGS. 2A and 2B) as described below in greater detail. In other embodiments, the processor 146 may be configured to perform operations of the method 200 without implementing the ML module 148 itself.

Code Repository System

Code repository system 172 is generally any device that is configured to process data and communicate with other components of the system 100 via the network 102. The code repository system 172 may comprise a processor 174 in signal communication with a memory 178 and a network interface 176. The code repository system 172 may be also referred to as a central code repository system.

Processor 174 comprises one or more processors operably coupled to the memory 178. The processor 174 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 174 may be a programmable logic device, a microcontroller, a microprocessor, or any suitable combination of the preceding. The one or more processors are configured to process data and may be implemented in hardware or software. For example, the processor 174 may be 8-bit, 16-bit, 32-bit, 64-bit, or of any other suitable architecture. The one or more processors are configured to implement various software instructions to perform the operations described herein. For example, the one or more processors are configured to execute software instructions 180 and perform one or more functions described herein.

Network interface 176 is configured to enable wired and/or wireless communications (e.g., via network 102). The network interface 176 is configured to communicate data between the code repository system 172 and other components of the system 100. For example, the network interface 176 may comprise a WIFI interface, a local area network (LAN) interface, a wide area network (WAN) interface, a modem, a switch, or a router. The processor 174 is configured to send and receive data using the network interface 176. The network interface 176 may be configured to use any suitable type of communication protocol as would be appreciated by one of ordinary skill in the art.

Memory 178 may be volatile or non-volatile and may comprise a read-only memory (ROM), random-access memory (RAM), ternary content-addressable memory (TCAM), dynamic random-access memory (DRAM), and static random-access memory (SRAM). Memory 178 may be implemented using one or more disks, tape drives, solid-state drives, and/or the like. Memory 178 is operable to store software instructions 180, and/or any other data and instructions. The software instructions 180 may comprise any suitable set of software instructions, logic, rules, or code. Memory 178 may be further operable to store the latest versions of the server images 170 and the performance-optimized versions of the server images 158.

Provisioning System

Provisioning system 182 is generally any device that is configured to process data and communicate with other components of the system 100 via the network 102. The provisioning system 182 may comprise a processor 184 in signal communication with a memory 188 and a network interface 186.

Processor 184 comprises one or more processors operably coupled to the memory 188. The processor 184 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 184 may be a programmable logic device, a microcontroller, a microprocessor, or any suitable combination of the preceding. The one or more processors are configured to process data and may be implemented in hardware or software. For example, the processor 184 may be 8-bit, 16-bit, 32-bit, 64-bit, or of any other suitable architecture. The one or more processors are configured to implement various software instructions to perform the operations described herein. For example, the one or more processors are configured to execute software instructions 190 and perform one or more functions described herein.

Network interface 186 is configured to enable wired and/or wireless communications (e.g., via network 102). The network interface 186 is configured to communicate data between the provisioning system 182 and other components of the system 100. For example, the network interface 186 may comprise a WIFI interface, a local area network (LAN) interface, a wide area network (WAN) interface, a modem, a switch, or a router. The processor 184 is configured to send and receive data using the network interface 186. The network interface 186 may be configured to use any suitable type of communication protocol as would be appreciated by one of ordinary skill in the art.

Memory 188 may be volatile or non-volatile and may comprise a read-only memory (ROM), random-access memory (RAM), ternary content-addressable memory (TCAM), dynamic random-access memory (DRAM), and static random-access memory (SRAM). Memory 188 may be implemented using one or more disks, tape drives, solid-state drives, and/or the like. Memory 188 is operable to store software instructions 190, and/or any other data and instructions. The software instructions 190 may comprise any suitable set of software instructions, logic, rules, or code.

The provisioning system 182 may be configured to receive the performance-optimized versions of the server images 158 from the code repository system 172 and store them in the memory 188. The provisioning system 182 may be further configured to provision new servers (e.g., new server 192) with the performance-optimized versions of the server images 158.

New Server

New server 192 is generally any device that is configured to process data and communicate with other components of the system 100 via the network 102. The new server 192 may be an application server, a middleware server, or a database server. The new server 192 may comprise a processor 194 in signal communication with a memory 198 and a network interface 196.

Processor 194 comprises one or more processors operably coupled to the memory 198. The processor 194 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 194 may be a programmable logic device, a microcontroller, a microprocessor, or any suitable combination of the preceding. The one or more processors are configured to process data and may be implemented in hardware or software. For example, the processor 194 may be 8-bit, 16-bit, 32-bit, 64-bit, or of any other suitable architecture. The one or more processors are configured to implement various software instructions to perform the operations described herein. For example, the one or more processors are configured to execute software instructions 199 and perform one or more functions described herein.

Network interface 196 is configured to enable wired and/or wireless communications (e.g., via network 102). The network interface 196 is configured to communicate data between the new server 192 and other components of the system 100. For example, the network interface 196 may comprise a WIFI interface, a local area network (LAN) interface, a wide area network (WAN) interface, a modem, a switch, or a router. The processor 194 is configured to send and receive data using the network interface 196. The network interface 196 may be configured to use any suitable type of communication protocol as would be appreciated by one of ordinary skill in the art.

Memory 198 may be volatile or non-volatile and may comprise a read-only memory (ROM), random-access memory (RAM), ternary content-addressable memory (TCAM), dynamic random-access memory (DRAM), and static random-access memory (SRAM). Memory 198 may be implemented using one or more disks, tape drives, solid-state drives, and/or the like. Memory 198 is operable to store software instructions 199, and/or any other data and instructions. The software instructions 199 may comprise any suitable set of software instructions, logic, rules, or code.

In certain embodiments, the new server 192 is provisioned by the provisioning system 182 with the performance-optimized version of the server image 158. In such embodiments, the memory 198 may further store the performance-optimized version of the server image 158. The new server 192 may be added to the plurality of servers 104 and may be integrated into the full-stack environment.

Example Method for Creating a Performance-Optimized Version of a Server Image

FIGS. 2A and 2B illustrate an example flowchart of a method 200 for creating a performance-optimized server image for a server. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions (e.g., instructions 128, 138, 166, 180, and 190 of FIG. 1), stored on non-transitory, tangible, machine-readable medium (e.g., memories 126, 136, 164, 178, and 188 of FIG. 1) that when executed by one or more processors (e.g., processors 122, 132, 146, 174, and 184 of FIG. 1) implements an ML module (e.g., ML module 148 of FIG. 1) and may cause the one or more processors to perform operations 202-242.

At operation 202, one or more monitoring systems (e.g., one or more monitoring systems 120 of FIG. 1) monitor performance of one or more servers (e.g., servers 104 of FIG. 1) of a first type. In certain embodiments, the one or more servers of the first type comprise one or more application servers. In other embodiments, the one or more servers of the first type comprise one or more middleware servers. In yet other embodiments, the one or more servers of the first type comprise one or more database servers.

At operation 204, the one or more monitoring systems generate logs (e.g., logs 140 of FIG. 1) based on the monitored performance of the one or more servers.

At operation 206, a log server (e.g., log server 130 of FIG. 1) receives the logs from the one or more monitoring systems.

At operation 208, an image creation system (e.g., image creation system 142 of FIG. 1) receives the logs from the log server.

At operation 210, the image creation system receives a latest version of a server image (e.g., latest version of server image 170 of FIG. 1) of the first type from a first code repository (e.g., code repository 168 of FIG. 1). In certain embodiments, the server image of the first type comprises an application server image. In other embodiments, the server image of the first type comprises a middleware server image. In yet other embodiments, the server image of the first type comprises a database server image.

At operation 212, the image creation system determines current values for performance parameters (e.g., current values for performance parameters 150 of FIG. 1) of the one or more servers based on the logs. In certain embodiments, the performance parameters of the one or more servers may comprise an input-output operations per second (IOPS) performance, a response time, a computing performance, and/or a number of error messages for a pre-determined time interval.

At operation 214, the image creation system determines a most optimal server configuration (e.g., most optimal server configuration 152 of FIG. 1). The most optimal server configuration comprises optimal value ranges for the performance parameters (e.g., optimal value ranges for performance parameters 154 of FIG. 1). In certain embodiments, the optimal value ranges for the performance parameters are determined based on desired performance goals for the servers 104.

At operation 216, the image creation system compares a current value to a respective optimal value range for each of the performance parameters.

At operation 218, the image creation system determines if the current value is outside the respective optimal value range for at least one of the performance parameters. In response to determining that the current value is within the respective optimal value range for each of the performance parameters, method 200 continues to operation 220. In response to determining that the current value is outside the respective optimal value range for at least one of the performance parameters, method 200 continues to operation 222.

At operation 220, the image creation system determines that the latest version of the server image is a performance-optimized version of the server image. After operation 220, method 200 continues to operations 236, 238, 240 and 242, which are described below in greater detail.

At operation 222, the image creation system determines incremental changes (e.g., incremental changes 156 of FIG. 1) to be applied to the latest version of the server image. In certain embodiments, determining the incremental changes comprises determining incremental changes to memory allocation parameters, processor allocation parameters, and/or network bandwidth allocation parameters. The incremental changes may further comprise various patches or updates that may be available for the operating system and/or applications of the latest version of the server image.

At operation 224, the image creation system applies the incremental changes to the latest version of the image to create a new version of the server image (e.g., new version of server image 160 of FIG. 1).

At operation 226, the image creation system determines new values for the performance parameters (e.g., new values for performance parameters 162 of FIG. 1) based on the new version of the server image.

At operation 228, the image creation system compares a new value to a respective optimal value range for each of the performance parameters.

At operation 230, the image creation system determines is if the new value is within the respective optimal value range for each of the performance parameters. In response to determining that the new value is not within the respective optimal value range for at least one of the performance parameters, method continues to operation 222. In response to determining that the new value is within the respective optimal value range for each of the performance parameters, method continues to operation 232.

At operation 232, the image creation system validates the new version of the server image as a performance-optimized version of the server image (e.g., performance-optimized version of server image 158 of FIG. 1).

At operation 234, the image creation system builds the performance-optimized version of the server image.

At operation 236, the image creation system stores the performance-optimized version of the server image to the first code repository.

At operation 238, the image creation system sends the performance-optimized version of the server image to a second code repository (e.g., code repository system 172 of FIG. 1).

At operation 240, a provisioning system (e.g., provisioning system 182 of FIG. 1) receives the performance-optimized version of the server image from the second code repository.

At operation 242, the provisioning system provisions a new server of the first type (e.g., new server 192 of FIG. 1) with the performance-optimized version of the server image. In certain embodiments, the new server is added to the existing servers and is integrated into the full-stack environment.

In certain embodiments, operations 202-242 may be performed in a loop, such that when a new server is added to the existing plurality of servers, the new server is provisioned with the latest performance-optimized version of the server image.

The method 200 is integrated into a practical application of: (1) creating performance-optimized versions of server images; and (2) improving the performance of a full-stack environment by provisioning new servers with the performance-optimized versions of the server images.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
an image creation system, wherein the image creation system comprises:
a memory comprising:
a code repository, wherein the code repository stores latest versions of server images; and a machine learning algorithm configured, when executed, to create updated versions of server images;
a processor communicatively coupled to the memory, wherein the processor is configured to:
receive performance information of one or more servers of a first type, wherein the one or more servers of the first type are in a full-stack environment;
receive a latest version of a server image of the first type from the code repository;
execute the machine learning algorithm to:
determine current values for performance parameters of the one or more servers based at least in part upon the performance information, wherein the performance parameters comprises a response time and a number of error messages for a pre-determined time interval;
determine a target server configuration, wherein the target server configuration comprises target value ranges for the performance parameters;
compare for each of the response time and the number of error messages for a pre-determined time interval, a current value to a respective target value range;
in response to determining that, for at least one of the response time and the number of error messages for a pre-determined time interval, the current value is outside the respective target value range, determine one or more software updates associated with an operating system corresponding to the latest version of the server image;
create a new version of the server image by executing the one or more software updates associated with the operating system corresponding to the latest version of the server image;
determine new values for the performance parameters based on the new version of the server image;
compare, for each of the performance parameters, a new value to a respective target value range; and
in response to determining that, for each of the performance parameters, the new value is within the respective target value range, validate the new version of the server image as a target version of the server image;
build the target version of the server image;
provision a new server of the first type communicatively coupled to the apparatus in accordance with the target version of the server image; and
add the new server of the first type to the one or more servers of the first type in the full-stack environment.

2. The apparatus of claim 1, further comprising a provisioning system, wherein the provisioning system comprises a provisioning processor configured to:
receive the target version of the server image; and
in response to receiving the target version of the server image, provision the new server of the first type with the target version of the server image in a full stack environment.

3. The apparatus of claim 1, wherein the performance parameters comprise an input-output operations per second (IOPS) performance, or a computing performance.

4. The apparatus of claim 1, wherein the new version of the server image is created based at least in part upon changes to memory allocation parameters, processor allocation parameters, or network bandwidth allocation parameters.

5. The apparatus of claim 1, wherein a server of the first type comprises an application server, a database server, or a middleware server.

6. The apparatus of claim 1, wherein the processor is further configured to:

in response to determining that the current value is within the respective target value range for each of the performance parameters, determine that the latest version of the server image is the target version of the server image.

7. The apparatus of claim 1, wherein the processor is further configured to:

store the target version of the server image in the code repository.

8. A method comprising:

receiving performance information of one or more servers of a first type, wherein the one or more servers of the first type are in a full-stack environment;

receiving a latest version of a server image of the first type from a code repository;

executing a machine learning algorithm to perform one or more operations comprising:

determining current values for performance parameters of the one or more servers based at least in part upon the performance information, wherein the performance parameters comprises a response time and a number of error messages for a pre-determined time interval;

determining a target server configuration, wherein the target server configuration comprises target value ranges for the performance parameters;

comparing for each of the response time and the number of error messages for a pre-determined time interval, a current value to a respective target value range;

in response to determining that, for at least one of the response time and the number of error messages for a pre-determined time interval, the current value is outside the respective target value range, determining one or more software updates associated with an operating system corresponding to the latest version of the server image;

creating a new version of the server image by executing the one or more software updates associated with the operating system corresponding to the latest version of the server image;

determining new values for the performance parameters based on the new version of the server image;

comparing, for each of the performance parameters, a new value to a respective target value range; and in response to determining that, for each of the performance parameters, the new value is within the respective target value range, validating the new version of the server image as a target version of the server image;

building the target version of the server image;

provisioning a new server of the first type communicatively coupled to an apparatus in accordance with the target version of the server image; and adding the new server of the first type to the one or more servers of the first type in the full-stack environment.

9. The method of claim 8, further comprising:

in response to receiving the target version of the server image, provisioning the new server of the first type with the target version of the server image.

10. The method of claim 8, wherein the performance parameters comprise an input-output operations per second (IOPS) performance, or a computing performance.

11. The method of claim 8, wherein the new version of the server image is created based at least in part upon changes to memory allocation parameters, processor allocation parameters, or network bandwidth allocation parameters.

12. The method of claim 8, wherein a server of the first type comprises an application server, a database server, or a middleware server.

13. The method of claim 8, further comprising:

in response to determining that the current value is within the respective target value range for each of the performance parameters, determining that the latest version of the server image is the target version of the server image.

14. The method of claim 8, further comprising:

storing the target version of the server image in the code repository.

15. A non-transitory computer-readable medium storing instructions that, when executed by one or more processors, cause the one or more processors to:

receive performance information of one or more servers of a first type, wherein the one or more servers of the first type are in a full-stack environment;

receive a latest version of a server image of the first type from a code repository;

execute a machine learning algorithm to:

determine current values for performance parameters of the one or more servers based at least in part upon the performance information, wherein the performance parameters comprises a response time and a number of error messages for a pre-determined time interval;

determine a target server configuration, wherein the target server configuration comprises target value ranges for the performance parameters;

compare for each of the response time and the number of error messages for a pre-determined time interval, a current value to a respective target value range;

in response to determining that, for at least one of the response time and the number of error messages for a pre-determined time interval, the current value is outside the respective target value range, determine one or more software updates associated with an operating system corresponding to the latest version of the server image;

create a new version of the server image by executing the one or more software updates associated with the operating system corresponding to the latest version of the server image;

determine new values for the performance parameters based on the new version of the server image;

compare, for each of the performance parameters, a new value to a respective target value range; and in response to determining that, for each of the performance parameters, the new value is within the respective target value range, validate the new version of the server image as a target version of the server image;

build the target version of the server image;

provision a new server of the first type communicatively coupled to an apparatus in accordance with the target version of the server image; and add the new server of the first type to the one or more servers of the first type in the full-stack environment.

16. The non-transitory computer-readable medium of claim 15, wherein the instructions, when executed by the one or more processors, further cause the one or more processors to:

in response to receiving the target version of the server image, provision the new server of the first type with the target version of the server image.

17. The non-transitory computer-readable medium of claim 15, wherein the performance parameters comprise an input-output operations per second (IOPS) performance, or a computing performance.

18. The non-transitory computer-readable medium of claim 15, wherein the new version of the server image is created based at least in part upon changes to memory allocation parameters, processor allocation parameters, or network bandwidth allocation parameters.

19. The non-transitory computer-readable medium of claim 15, wherein a server of the first type comprises an application server, a database server, or a middleware server.

20. The non-transitory computer-readable medium of claim 15, wherein the instructions, when executed by the one or more processors, further cause the one or more processors to:

in response to determining that the current value is within the respective target value range for each of the performance parameters, determine that the latest version of the server image is the target version of the server image.

* * * * *